United States Patent [19]

Martin et al.

[11] 3,758,579

[45] Sept. 11, 1973

[54] ALPHA-BROMOACRYLIC ACID TOLUIDIDES

[75] Inventors: Henry Martin, Basel, Switzerland; Georg Pissiotas, Loerrach, Germany

[73] Assignee: Ciba-Geigy AG, Basel, Switzerland

[22] Filed: July 27, 1971

[21] Appl. No.: 166,575

[30] Foreign Application Priority Data
July 31, 1970 Switzerland.................. 11589/70

[52] U.S. Cl.............. 260/562 B, 71/118, 260/454
[51] Int. Cl............................................ C07c 103/58
[58] Field of Search.................. 260/562, 454, 774

[56] References Cited
UNITED STATES PATENTS
3,538,153  11/1970  Randall........................... 260/562
2,957,800  10/1960  Hopkins et al.................. 260/562
3,657,340  4/1972  Johnson et al.................. 260/562

FOREIGN PATENTS OR APPLICATIONS
484,871  1/1970  Switzerland..................... 260/562

OTHER PUBLICATIONS

Knunpants et al., Zh Obshch. Khim., Vol. 32, p. 1262–1274, (1962).
Golovyashkina, Chem. Abstracts, Vol. 69, item 106164 (1968).

Primary Examiner—Harry I. Moatz
Attorney—Karl F. Jorda et al.

[57] ABSTRACT

$\alpha$-Bromo-acrylic-acid-anilides which are substituted in the phenyl nucleus by at least one substituent have been found to be effective compounds for influencing the plant development. They may be used for regulating fruit abscission.

3 Claims, No Drawings

ALPHA-BROMOACRYLIC ACID TOLUIDIDES

The invention relates to new anilides, their manufacture and their use as active substances in agents for regulating plant development. The new anilides correspond to the formula

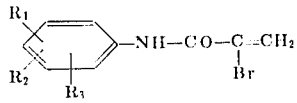
(I)

in which $R_1$, $R_2$ and $R_3$ each represents halogen or $C_1$-$C_4$ alkyl, $C_1$-$C_4$ halogenoalkyl, $C_1$-$C_4$ alkoxy, $C_2$-$C_4$ alkenyloxy, $C_2$-$C_4$ alkinyloxy, $O_2N$ or NCS- and $R_2$ and $R_3$ also represent hydrogen.

Halogens are to be understood as meaning fluorine, chlorine, bromine or iodine. The $C_1$-$C_4$ alkyl, $C_1$-$C_4$ halogenoalkyl and $C_1$-$C_4$ alkoxy groups represented by $R_1$, $R_2$ and $R_3$ possess straight-chain or branched alkyl radicals. In the context of the present invention these groups represent, for example, methyl, trifluoromethyl, ethyl, propyl, isopropyl, n-, iso-, sec.-, tert.- butyl, methoxy, ethoxy, allyloxy, methallyloxy, propargyloxy, isobutinyloxy.

Particular importance attaches to compounds of the formula

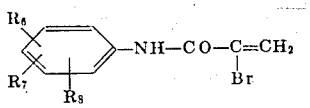
(II)

in which $R_6$, $R_7$ and $R_8$ independently of one another may represent chlorine or $C_1$-$C_4$ alkyl and $R_7$ and $R_8$ may also represent hydrogen.

The anilides of the formula I can be manufactured by methods which are described in the literature, for example by reacting an aniline of the formula

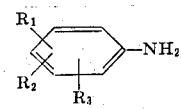
(III)

in which $R_1$, $R_2$ and $R_3$ have the meanings given for the formula I, with an acid of the formula

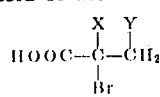
(IV)

or with a derivative thereof which is capable of forming an acid amide, in which one of the two substituents X and Y represents hydrogen and the other represents bromine, with the subsequent splitting off of one mol of HBr in the presence of a component acting as a base, or in which X and Y represent a further carbon-carbon bond. In this latter case the structural formula IV represents α-bromacrylic acid.

As derivatives of acids of the formula IV which are capable of forming acid amides it is possible to use halides, for example chlorides or bromides, preferably in the presence of hydrogen halide binding agents such as tertiary amines, and also anhydrides. It is also possible to react an acid of the formula IV with an aniline of the formula III in the presence of an agent which splits off water such, for example, as $PCl_2$, $POCl_3$, $P_2O_5$ and the like.

Basic components used for splitting off hydrogen bromide are tertiary amines, such as triethylamine, pyridine, triethylenediamine etc.; but alkali hydroxides, such as KOH or NaOH, are also used.

One of the possible methods of manufacturing compounds of the formula I consists in reacting acrylic chloride or acrylic bromine with an aniline of the formula III in the presence of triethylamine in an inert solvent and the subsequent addition of bromine to the resulting acrylic acid anilide in a solvent such as glacial acetic acid to form the αβ-dibromopropionic acid anilide of the formula V

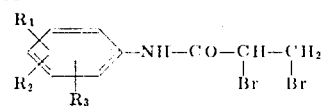
(V)

in which $R_1$, $R_2$ and $R_3$ have the meanings given for the formula I, and from which the desired final product is obtained by splitting off one mol of Hbr. In this reaction process it is, of course, also possible to use αβ-dibromopropionic acid halide as starting material, to react it with the aniline of the formula III in an inert solvent and subsequently to split off one mol of Hbr in the presence of a basic component. Instead of an α, β-dibromopropionic acid halide, it is possible likewise to react an α-bromo-β-chloropropionic acid halide or an α-bromo-β-iodopropionic acid halide with an aniline of the formula III.

A further possible method of manufacture consists in similarly reacting an aniline of the formula III with α,α-dibromopropionic acid, which is obtained by the bromination of propionic acid, or with a derivative thereof which is capable of forming an acid amide, and subsequently splitting off one mole of HBr under the conditions described above.

The compounds of the formula I are suitable for regulating the abscission of fruit, that is to say, by applying then to fruit shortly before it ripens, the harvesting of the entire fruit crop can be determined (within a slight range of fluctuation) for a certain definite time. This measure constritutes not only to the rational harvesting of large-scale fruit cultivations and which to an increasing extent is carried out by mechanical means, but above all lightens the force that is applied to pick or shake the fruit. This means that mechanical damage to the plant, for example the fruit tree, is reduced to a minimum. Damage to young shoots, which may reduce the yield the following year, is largely ruled out.

Active substances of the formula I are used primarily for stone fruit and pomaceous fruit, for example for fruit trees such as apple, pear, damson, peach, apricot, olive, citrus fruit, nut and also cherry; but partly too for ripening berries (red currants, gooseberries, grapes etc.)

For regulating the abscission of fruit, the active substances of the formula I can be used as pure concentrate or together with suitable carriers and/or other additives.

Suitable carriers additives may be solid or liquid and correspond to the substances convertionally used in formulation technique such, for example, as natural or regenerated mineral substances, solvents, dispersants, wetting agents, adhesives, thickeners or binders.

These agents can be applied by spraying the plants with an aqueous solution or dispersion which contains the active substances according to the invention in concentrations of 100 to 3,000 ppm (parts per million).

To manufacture solutions solvents may be used, especially alcohols, for example ethanol or isopropanol; ketones, such as acetone or cyclohexanone; aliphatic hydrocarbons, for example kerosene; and cyclic hydrocarbons, such as benzene, toluene, xylene, tetrahydronaphthalene, alkylated naphthalenes; in addition, chlorinated hydrocarbons, such as tetrachloroethane, ethylene chloride; and finally also mineral and vegetable oils or mixtures of the above mentioned substances.

The aqueous preparations are dispersions. The active substances are homogenised in water as such or in one of the above mentioned solvents, preferably using dispersants. Suitable cationic dispersants are, for example, quaternary ammonium compounds; anionic dispersants are, for example, soaps, aliphatic long-chain sulphuric acid monoester, aliphatic-aromatic sulphonic acids, long-chain alkoxyacetic acids; non-ionic dispersants are polyglycol ethers of fatty alcohols or p-tert.-alkylphenols with ethylene oxide. On the other hand, it is also possible to manufacture concentrates consisting of active substance, dispersant and, if desired, solvent. Such concentrates can be diluted before use, for example with water, and are then in the form of emulsions or suspensions.

Dusts can be manufactured by mixing or conjointly grinding the active substance with a solid carrier, by which there may also be understood microgranules. Such solid carriers are, for example; talcum, diatomaceous earth, kaolin, bentonite, calcium carbonate, boric acid, tricalcium phosphate, also saw dust, cork powder, charcoal, and other materials of vegetable origin. By adding wetting agents and protective colloids, pulverulent preparations and pastes may be made suspendible in water and used as sprays.

The content of active substance in the above described agents is between 0.1 to 95 percent; and in this connection it should be mentioned that when applied from an aircraft or by some other suitable means of application, concentrations of up to 99.5 percent or commercially pure active substance may be used.

The new agents containing active substances of the formula I may also contain further pesticidal compounds and/or further compounds which exert a favourable influence on plant morphology or plant development.

The following Examples illustrate the invention.

EXAMPLE 1 a. 96 Grams of p-toluidine were dissolved in 300 ml of chloroform and the solution was treated with 43.5 g of pyridine. 250.5 Grams of $\alpha\beta$-dibromopropionic acid chloride were added dropwise at 30°–45° C. After being stirred for 14 hours at room temperature, the reaction mixture was rinsed twice with water, in the process of which a precipitate formed. 275 Grams of crude product of the formula

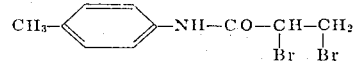

were obtained, which after recrystallisation from chloroform melted at 146°–148° C.

b. 321 Grams of the thus obtained $\alpha, \beta$-dibromopropionic acid-4-methyl anilide were charged into 500 ml of absolute ethanol and the mixture was then heated. Thereto was added dropwise a solution consisting of 90 g of pure potassium hydroxide in 250 ml of absolute ethanol. The temperature of the reaction mixture rose from 60° to approx. 68° C. Upon aomplete of the addition, the mixture was heated for 4 hours under reflux. It was subsequently cooled with suction. The filtrate was concentrated to yield 68 percent of theory of the active substance $\alpha$-bromoacrylic acid-4-methyl-anilide.

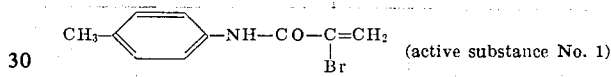 (active substance No. 1)

which after recrystallisation from hexane melts at 67°–69° C.

In analogous manner the compounds of the formula

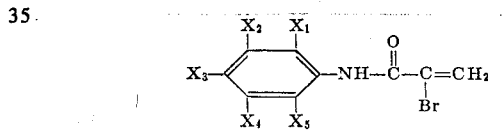

were also manufactured.

| Comp. No.: | $X_1$ | $X_2$ | $X_3$ | $X_4$ | $X_5$ | M.P., °C. |
|---|---|---|---|---|---|---|
| 2 | H | Cl | H | H | H | 87–88 |
| 3 | H | H | Cl | H | H | 88–89 |
| 4 | H | Cl | Cl | H | H | 118–119 |
| 5 | H | CF$_3$ | Cl | H | H | 93–95 |
| 6 | Cl | H | Cl | H | H | 82–83 |
| 7 | H | Cl | CH$_3$ | H | H | 75–76 |
| 8 | H | CH$_3$ | Cl | H | H | 85–88 |
| 9 | H | H | J | H | H | 99–101 |
| 10 | H | H | Br | H | H | 98–101 |
| 11 | H | H | F | H | H | 54–56 |
| 12 | H | H | OC$_4$H$_9$ | H | H | 101–102 |
| 13 | CH$_3$ | H | Cl | H | H | 65–69 |
| 14 | H | H | NO$_2$ | H | H | 130–132 |
| 15 | H | NO$_2$ | H | H | H | 125–127 |
| 16 | H | H | —SCN | H | H | 116–118 |
| 17 | H | Cl | OCH$_3$ | H | H | 84–86 |
| 18 | H | J | H | H | H | 104 |
| 19 | H | Br | H | H | H | 98–100 |
| 20 | CH$_3$ | H | H | H | H | 56–57 |
| 21 | CH$_3$ | H | H | CH$_3$ | H | 85–86 |
| 22 | Cl | H | Cl | Cl | H | 149–150 |
| 23 | Cl | H | H | Cl | H | 94–96 |
| 24 | H | Cl | H | Cl | H | 80–82 |
| 25 | Cl | Cl | H | H | H | 86–88 |
| 26 | H | CH$_3$ | H | H | H | 78–80 |
| 27 | Cl | H | H | H | Cl | 101–103 |
| 28 | C$_2$H$_5$ | H | H | H | H | (¹) |
| 29 | Cl | H | C$_2$H$_5$ | H | H | 76–79 |
| 30 | H | H | —O—CH$_2$—CH—CH$_2$ | H | H | (¹) |
| 31 | H | H | —O—CH$_2$—C≡CH | H | H | (¹) |
| 32 | H | —O—CH$_2$—CH=CH$_2$ | H | H | H | (¹) |
| 33 | H | —O—CH$_2$—C≡CH | H | H | H | (¹) |
| 34 | H | —O—CH$_2$—C=CH$_2$<br>                CH$_3$ | H | H | H | (¹) |
| 35 | H | —O—C—C≡CH<br>         CH$_3$ | H | H | H | (¹) |

¹Oil.

EXAMPLE 2

Formation
Wettable powder
  To manufacture a wettable powder, the following components for example were mixed and finely ground:
  50 parts of active substance according to the present invention
  20 parts of highlyadsorptive silica
  25 parts of bolus alba (kaolin)
  1.5 parts of sodium 1-benzyl-2-stearyl-benzimidazole-6,3'-di-sulphate
  3,5 parts of a reaction product of p-tert.octylphenol and ethylene oxide.

Emulsion concentrate
  Readily soluble active substances were formulated also as emulsion concentrate according to the following prescription:
  20 parts of active substance
  70 parts of xylene and
  10 parts of a mixture of a reaction product of an alkylphenol with ethylene oxide and calcium benzenesulphonate were mixed.
  A sprayable emulsion was obtained by diluting the mixture with water to the desired concentration.

EXAMPLE 3

Activity on the abscission of oranges
Aqueous preparation containing 1,000 ppm were manufactured from emulsion concentrates of active substances No.'s 1, 3, 8, 9, 10, 20 and 26. Five orange trees with ripening fruit were sprayed once with each of these preparations. After 7 days, the average values of the plucking force indicated in the following table were determined using a spring balance. The average value of the plucking force in the case of 5 untreated orange trees served as control.

TABLE 1

| Active substance No. | Average values plucking force in kg |
|---|---|
| 1 | 0,998 |
| 3 | 1,374 |
| 8 | 0,408 |
| 9 | 0,499 |
| 10 | 0,499 |
| 20 | 0,408 |
| 26 | 0,499 |
| Control | 3,720 |

EXAMPLE 4

Activity on the abscission of damsons
Aqueous preparation containing 500 ppm and 1,000 ppm of active were prepared from emulsion concentrates of active substances No.'s 3 and 20. In the canton of Valais, Switzerland, damson trees were sprayed 10 days before the fruit was ripe for plucking in such a manner that leaves and fruit were wetted. Four branches each having about 25 damsons were used per test. After 10 days the following activity had been attained and the plucking force was determined with a spring balance:

TABLE 2

| Compound No. | Rate of application | Fallen fruit | Plucking force of the remaining fruit in g (average values) |
|---|---|---|---|
| 3 | 500 | 53,7% | 479,6 |
|   | 1000 | 76,5% | 428,2 |
| 20 | 500 | 26,8% | 564,5 |
|   | 1000 | 38,0% | 508,8 |
| Control | — | <1% | 825,5 |

We claim:
1. The compound
   α-Bromacrylic acid-2-methyl-anilide.
2. The Compound
   α-Bromacrylic acid-3-methylanilide.
3. The Compound
   α-Bromacrylic acid-4-methylanilide.

* * * * *